United States Patent [19]
Andreesen

[11] Patent Number: 4,881,746
[45] Date of Patent: Nov. 21, 1989

[54] HANDLE COVER AND TOY HOLDER

[76] Inventor: Sara Andreesen, 314 S. 17th, Ord, Nebr. 68862

[21] Appl. No.: 223,626

[22] Filed: Jul. 25, 1988

[51] Int. Cl.⁴ ............................ B62B 3/02; B62B 9/26
[52] U.S. Cl. ................................................ 280/33.992
[58] Field of Search ............... 16/DIG. 24, DIG. 25, 16/116 A; 280/33.99 A, 33.99 B, 33.992, 33.993; 229/87 R, DIG. 6; 297/484, 229, DIG. 6, 488; 24/298, 300, 301, 302, 464, DIG. 16; 150/154, 155

[56] References Cited

U.S. PATENT DOCUMENTS

| | | | |
|---|---|---|---|
| 1,208,121 | 12/1916 | Fitzgerald | 297/229 |
| 2,803,849 | 8/1957 | Peters | 280/33.99 A |
| 3,612,605 | 10/1971 | Posey, Jr. | 297/484 |
| 3,866,649 | 2/1975 | Bringmann | 280/33.99 A X |
| 4,568,125 | 2/1986 | Sckolnik | 297/229 X |
| 4,655,502 | 4/1987 | Houllis | 297/229 |
| 4,666,207 | 5/1987 | Quartano | 297/488 X |
| 4,761,032 | 8/1988 | Sanchez et al. | 297/DIG. 6 X |

*Primary Examiner*—Charles A. Marmor
*Assistant Examiner*—Tamara L. Finlay
*Attorney, Agent, or Firm*—Arvid Zuber

[57] ABSTRACT

This invention is for a handle cover and toy holder for a shopping cart. The handle cover and toy holder is comprised of strip of washable fabric of a width sufficient to encompass a shopping cart handle and length sufficient to substantially cover the handle with closure members along both longitudinal sides of the strip along with a strap which is an integral part of the structure and serves the dual purpose of a toy holder and of holding the strip of fabric when folded.

5 Claims, 1 Drawing Sheet

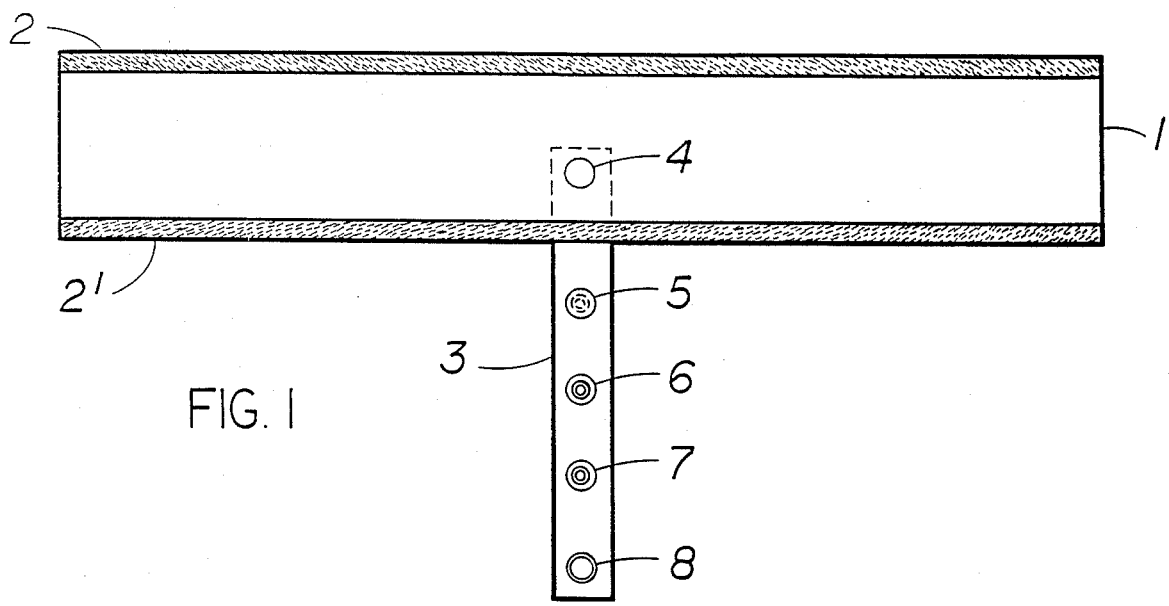
FIG. 1
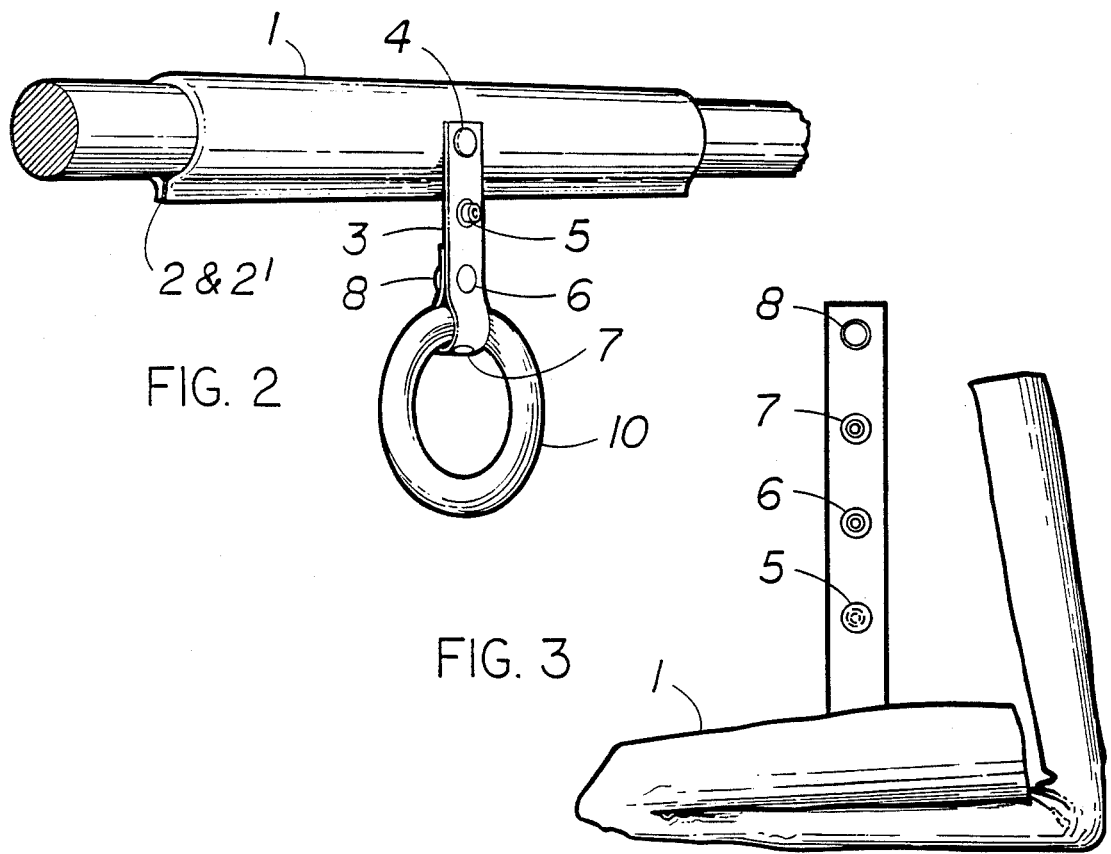
FIG. 2
FIG. 3
FIG. 4
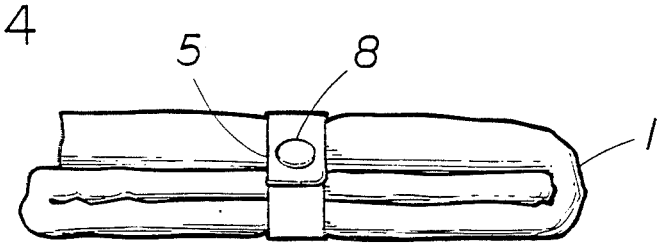

HANDLE COVER AND TOY HOLDER

BACKGROUND OF THE INVENTION

This invention is for a handle cover and toy holder for a push cart, particularly a cart of the type used in supermarkets.

As is well-known, infants and small children have a propensity for chewing on their hands and any handy object. Placed on the seat of a shopping cart, facing the pusher and with small hands in proximity to the handle of the cart, the child is likely to chew on the handle of the cart. Likewise, small hands are to be expected to proceed from the handle to the mouth and to repeat the process. Consequently, a mother may, properly, be concerned that the uncertain sanitary history of the handle may have on untoward effect on the infant, particularly so considering recent medical studies that demonstrate that common viral infections are readily transmitted by hand contact. Although, to some degree, the problem may be mitigated by providing a teething ring or suitable chewable toy to occupy the infant's attention, as is well-known, infants delight in throwing or dropping such objects. Therefore, the structure also provides means for holding a toy, teething ring, or the like.

It is, therefore, an object of this invention to provide a clean cover for a shopping cart handle.

It is a further object of this invention to provide, as an integral part of the structure, a holder for a suitable toy or teething ring.

It is a still further object of this invention to provide a foldable structure with its own fastening means that can be easily compacted and carried in a purse or shopping bag.

BRIEF DESCRIPTION OF THE DRAWINGS

FIG. 1 depicts the cover and toy holder in open position.

FIG. 2 shows the cover in position on the shopping cart handle with closure means engaged to hold a toy.

FIG. 3 depicts the partially folded cover and toy holder.

FIG. 4 illustrates a folded cover with the strap encircling the cover and with the closure means engaged.

DETAILED DESCRIPTION OF THE INVENTION

This invention is for a cover and toy holder for a shopping cart handle that is comprised of a strip of washable fabric of a width sufficient to encompass a shopping cart handle and of a length sufficient to substantially cover the handle, said strip of fabric having closure means along the edges of both longitudinal sides of the strip, said strip of fabric being equipped with a strap, said strap being of a length at least as long as that required to snugly encompass said strip of fabric when compactly folded about its longitudinal length, said strap being equipped with a cooperating pair of closure means with one member of the pair on the proximal portion of the strap and the other on the distal portion of the strap at a distance from each other approximately equal to the girth of the folded strip of fabric, said strap being further equipped with closure means cooperating with the closure means on the distal portion of the strap and located at a distance from the distal closure means long enough to form a loop to hold a toy when this means is engaged with the closure means on the distal portion of the strap.

The invention is further described with respect to the drawings.

FIG. 1 depicts the cover and toy holder in open position. In this Fig. number 1 is a strip of fabric of appropriate length and width, 2 and 2', VELCRO hook and loop fastener, providing the closure means, 3, the strap, 4, the attachment of the strap to the strip of fabric, 5, the rear part of the female portion of the snap which provides one of the pair of cooperative closure means by which the folded strip is secured, 6, the front part of the female portion of a snap, 7, the front part of the female portion of a snap, 8, the front part of the male portion of a snap. In use, 8, cooperates with either, 6, or, 7, to provide a loop to hold a toy, 10, or, with 5, to secure the folded strip of fabric.

FIG. 2 depicts the cover in place on a shopping cart handle, 9, with closure means, 2 and 2', engaged and with closure means, 6, and, 8, engaged to hold the toy, 10. In FIG. 2, numbers 3, 5, and, 7, are the same as in FIG. 1.

FIG. 3 depicts the partially folded cover with, 4, being concealed and, 3, 5, 6, 7, and, 8, being the same as in FIG. 1.

FIG. 4 depicts the strip folded in thirds with, 5, and, 8, being engaged to hold the folds in place.

As will be readily understood a variety of means can be used for closures on the strap, buttons and buttonholes, belt buckles, either self-engaging or for use with holes or other engaging means, hooks and eyes, and snaps. Snaps are preferred.

Likewise, various closure means may be used on the sides of the strip of fabric; zippers, buttons, snaps, etc. can be used as can the nylon closure sold under the name VELCRO: VELCRO hook and loop fastener; Velcro is preferred for this purpose.

Since a principal object of this invention is to provide a clean surface for the shopping cart handle, the fabric from which the cover is fashioned should be such as to be readily cleaned. Although "fabric" is intended, within the scope of this invention, to include any flexible, readily cleansed material including plastics, rubbers, leather and the like, woven textiles are preferred.

The term "compactly folded strip of fabric" is intended to include any reasonable method of folding the strip, including, as illustrated, the strip folded in thirds, or, in the extreme, the strip so tightly folded as to be, essentially, rolled up. As will be understood, the strap should be so located as to be adapted to securing the folded strip according to the anticipated manner of folding. If, as illustrated in FIG. 4 the strip is folded in thirds, the strap is, advantageously, located in the middle of the strip. However, if the strip is so tightly folded as to be rolled, the strap is, best positioned at one end of the strip and may be attached by a snap or other rotatable member so that the strap may be readily used to secure the cylindrical configuration.

Therefore, within the broad description of the invention set forth above it will be seen that in its preferred embodiment the handle cover and toy holder is comprised of a washable strip of woven textile fabric of a width sufficient to encompass a shopping cart handle and of a length sufficient to substantially cover the handle, said strip of fabric having closure means comprised of VELCRO hook and loop fasteners strips along both longitudinal sides of the strip, said strip of fabric being equipped with a strap fastened to the strip at a point approximately in the middle of the strip, said strap being of a length at least long enough to snugly encompass said strip of fabric when compactly folded about its longitudinal length, said strap being equipped with one part of a pair of snaps in the proximal portion of the strap with the other part on the distal portion of the strap at a distance from each other approximately equal to the girth of the compactly folded strip of fabric, said strap being further equipped with another snap portion adapted to cooperate with the aforesaid part of the snap located on the distal portion of the strap at a distance sufficient to form a loop to hold a toy.

What is claimed is:

1. A cover and toy holder for a shopping cart handle comprised of a strip of washable fabric of a width sufficient to encompass a shopping cart handle and of a length sufficient to substantially cover the handle, said strip of fabric having closure means along the edges of both longitudinal sides of the strip, said strip of fabric being equipped with a strap, said strap being of a length at least as long as that required to snugly encompass said strip of fabric when compactly folded about its longitudinal length, said strap being equipped with a cooperating pair of closure means with the first closure means of the pair on the proximal portion of the strap and the second closure means of the pair on the distal portion of the strap at a distance from each other approximately equal to the girth of the folded strip of fabric, said strap being further equipped with third closure means cooperating with the second closure means located at a distance from said second closure means long enough to form a loop to hold a toy when this third closure means is engaged with the second closure means.

2. The cover and toy holder of claim 1 wherein the cooperating pair of closure means and third closure means on the strap are snaps.

3. The cover and toy holder of claim 1 wherein the closure means along the longitudinal sides of the strip are comprised of a VELCRO hook and loop fastener.

4. The cover and toy holder of claim 1 wherein the closure means along the longitudinal sides of the strip are comprised of a VELCRO hook and loop fastener and the cooperating pair of closure means and third closure means on the strap are snaps.

5. A handle cover and toy holder comprised of a washable strip of woven textile fabric of a width sufficient to encompass a shopping cart handle and of a length sufficient to substantially cover the handle, said strip of fabric having closure means comprised of VELCRO hook and loop fasteners along both the longitudinal sides of the strip, said strip of fabric being equipped with a strap fastened to the strip at a point approximately in the middle of the strip, said strap being of a length at least long enough to snugly encompass said strip of fabric when compactly folded about its longitudinal length, said strap being equipped with a first part of a pair of snaps in the proximal portion of the strap with the second part on the distal portion of the strap at a distance from each other approximately equal to the girth of the compactly folded strip of fabric, said strap being further equipped with a third snap portion to cooperate with the aforesaid second part of the snap located on the distal portion of the strap and said third snap portion also located on the distal portion of the strap at a distance from said second part of the snap sufficient to form a loop to hold a toy.

* * * * *